US010034300B2

(12) United States Patent
Rangarajan et al.

(10) Patent No.: US 10,034,300 B2
(45) Date of Patent: Jul. 24, 2018

(54) LOAD BASED PROBE RESPONSE SCHEDULING (75) Inventors: Hari Rangarajan, San Jose, CA (US); Tak Ming Pang, Fremont, CA (US); Sandeep Shetty, San Jose, CA (US)

(73) Assignee: Cisco Technology, Inc, San Jose, CA (US)

(*) Notice: Subject to any disclaimer, the term of this patent is extended or adjusted under 35 U.S.C. 154(b) by 2121 days.

(21) Appl. No.: 12/797,913

(22) Filed: Jun. 10, 2010

(65) Prior Publication Data

US 2011/0307609 A1 Dec. 15, 2011

(51) Int. Cl.
*G06F 15/173* (2006.01)
*H04W 72/12* (2009.01)
*H04W 48/16* (2009.01)

(52) U.S. Cl.
CPC ........ *H04W 72/1252* (2013.01); *H04W 48/16* (2013.01)

(58) Field of Classification Search
CPC . H04W 88/02; H04W 48/16; H04W 72/1252; H04W 36/08; H04W 48/10; H04W 48/20; H04W 72/04; H04W 84/12; H04L 12/2697; H04L 47/14; H04L 5/003
USPC .......................................................... 370/338
See application file for complete search history.

(56) References Cited

U.S. PATENT DOCUMENTS

| | | | | |
|---|---|---|---|---|
| 4,801,866 A * | 1/1989 | Wixley | ............. | G01R 1/06705 324/686 |
| 5,594,776 A * | 1/1997 | Dent | ................... | H04W 68/02 455/458 |
| 7,453,844 B1 * | 11/2008 | Lee | .................. | H04W 72/08 370/329 |
| 7,480,485 B1 * | 1/2009 | Oh et al. | ........................... | 455/7 |
| 7,539,169 B1 * | 5/2009 | O'Hara, Jr. | ............ | H04W 48/06 370/338 |
| 2002/0110105 A1 * | 8/2002 | Awater | .................. | H04W 36/22 370/338 |
| 2003/0053469 A1 * | 3/2003 | Wentink | ............. | H04L 12/5693 370/412 |
| 2003/0171116 A1 * | 9/2003 | Soomro | ........................ | 455/434 |
| 2004/0063455 A1 * | 4/2004 | Eran | .................... | H04J 13/0048 455/525 |
| 2004/0229621 A1 * | 11/2004 | Misra | .................... | H04W 16/08 455/445 |
| 2005/0003865 A1 * | 1/2005 | Lastinger et al. | ......... | 455/562.1 |

(Continued)

OTHER PUBLICATIONS

"Access Point Selection Strategy in IEEE802.11e WLAN Networks" Takeuchi et al., pp. 914-919, Sep. 18, 2006.

(Continued)

*Primary Examiner* — Christopher Biagini
(74) *Attorney, Agent, or Firm* — Patterson + Sheridan, LLP (57) ABSTRACT

In an example embodiment, an apparatus comprising an interface configured to communicate with at least one wireless transceiver, and a controller coupled to the interface. The controller is configured to determine a predefined characteristic such as current load and/or interference for a wireless channel associated with the at least one wireless transceiver. The controller is operable to suppress sending a probe response in response to the at least one wireless transceiver receiving a probe request, wherein how often probe responses are suppressed is based on the predefined characteristic for the wireless channel.

5 Claims, 5 Drawing Sheets

(56) References Cited

U.S. PATENT DOCUMENTS

| | | | |
|---|---|---|---|
| 2005/0213579 A1* | 9/2005 | Iyer | H04L 63/1441 370/395.2 |
| 2006/0094440 A1* | 5/2006 | Meier | H04L 12/189 455/453 |
| 2006/0111103 A1* | 5/2006 | Jeong | H04W 48/14 455/434 |
| 2006/0142004 A1* | 6/2006 | He | H04W 48/16 455/434 |
| 2006/0146747 A1* | 7/2006 | Shpak | 370/328 |
| 2006/0198348 A1* | 9/2006 | Lin et al. | 370/338 |
| 2007/0076596 A1* | 4/2007 | Roy | H04W 36/06 370/228 |
| 2007/0197246 A1* | 8/2007 | Julian | H04W 48/20 455/515 |
| 2007/0281711 A1* | 12/2007 | Matta | H04L 47/10 455/453 |
| 2007/0296998 A1* | 12/2007 | Iwamoto et al. | 358/1.14 |
| 2008/0009284 A1* | 1/2008 | Zhang | H04W 8/06 455/435.1 |
| 2008/0080387 A1* | 4/2008 | Wang | H04L 43/0852 370/252 |
| 2008/0080388 A1* | 4/2008 | Dean | H04L 12/2697 370/252 |
| 2008/0126668 A1* | 5/2008 | Okuno et al. | 711/100 |
| 2009/0077233 A1* | 3/2009 | Kurebayashi et al. | 709/224 |
| 2009/0290489 A1* | 11/2009 | Wang | H04W 28/06 370/230 |
| 2010/0001523 A1* | 1/2010 | Sato et al. | 290/31 |
| 2011/0103230 A1* | 5/2011 | Iyer | H04W 48/06 370/241 |

OTHER PUBLICATIONS

"Base Station Controlled Load Balancing with Handovers in Mobile WiMAX", Thomas Casey, Jan. 10, 2008.

\* cited by examiner

FIG. 10

LOAD BASED PROBE RESPONSE SCHEDULING

TECHNICAL FIELD

The present disclosure relates generally to load balancing for wireless networking.

BACKGROUND

Wireless client load balancing algorithms are based on the number of clients associated with an access point (AP). A client's association request is denied if the AP is not among the set of APs that have the lowest number of associated clients.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an interface configured to communicate with at least one wireless transceiver, and a controller coupled to the interface. The controller is configured to determine a current load for a wireless channel associated with the at least one wireless transceiver. The controller is operable to suppress sending a probe response in response to the at least one wireless transceiver receiving a probe request, wherein how often probe responses are suppressed is based on the current load for the wireless channel.

In accordance with an example embodiment, there is disclosed herein a method comprising receiving a wireless signal from a wireless device. A determination is made whether the wireless device is capable of communicating on multiple channels. A probe response to a probe request received from the wireless device on a first channel is suppressed responsive to determining the wireless device is capable of communicating on multiple channels.

In accordance with an example embodiment, there is disclosed herein, logic encoded on at least one non-transitory computer readable medium for execution. The logic when executed is operable to receive data representative of a signal strength for a wireless device from a plurality of wireless transceivers. The logic is further operable to suppress sending a response to a signal from the wireless device for a predetermined time period. The logic selects one of the plurality of wireless transceivers to respond to a signal from the wireless device based on received signal strength.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment disclosed herein, a load balancing employs a channel utilization parameter such as for example Quality of Service Basic Service Set (QBSS) load, and/or channel interference such as Radio Frequency (RF) spectrum measurements as channel metrics. The load/available bandwidth can be used to generate relative rankings for AP radios. AP radios with more favorable rankings will respond to probe requests more frequently than AP radios with less favorable rankings.

In an example embodiment, the ranking is performed by sorting neighboring APs based on their current load. The sorted APs can be inserted into a neighborhood heap, similar to a sorting tree. The depth level of a radio on the tree corresponds to its ranking. Parent and children nodes are immediate radio neighborhoods. Multiple depth levels can be collapsed later for mapping to a probe regulation schedule level. An AP responds to a probe request based on its regulation schedule level.

By manipulating probe response frequency and timing, a client can be directed to associate with an AP with a lighter load. Moreover, in an example embodiment the algorithm includes the selection of a designated AP radio, which is the radio with the lowest load/most available bandwidth, to respond to all client probe requests while regulating the probe responses of AP radios with higher loads.

Figure 1:
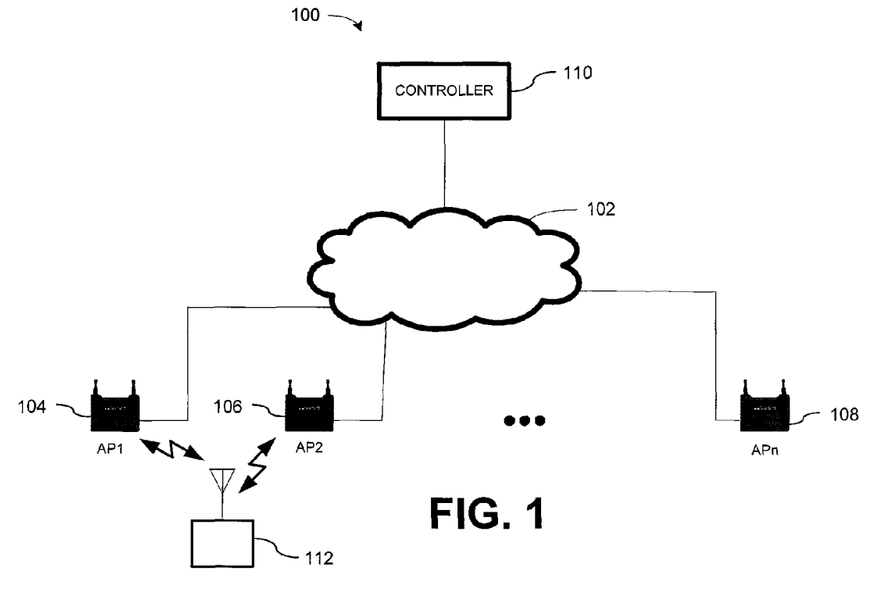
FIG. 1 is a block diagram illustrating an example of a system configured in accordance with an example embodiment.

FIG. 1 is a block diagram illustrating an example of a system 100 configured in accordance with an example embodiment. The illustrated example suitably comprises a network 102. Access points AP1 104, AP2, 106 and APn 108 are coupled to network 102. In the illustrated example n may be any physically realizable integer greater than two, although those skilled in the art should readily appreciate that three or more access points were selected for ease of illustrating the example embodiments herein and that the principles described herein may be applied to networks with as few as two access points, or some example embodiments may be suitable for operations with a single access point.

Controller 110 is coupled to network 102 and is operable communicate with APs 104, 106, 108 via network 102. For example, controller 110 may suitably comprise an interface for communicating with devices coupled to network 102 such as APs 104, 106, 108. Controller 110 is operable for controlling the operation of APs 104, 106, 108 and suitably comprises logic for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, controller 110 is configured to determine a current load for a wireless channel associated with the at least one wireless transceiver associated with at least one of APs 104, 106 and/or 108. Controller 110 is operable to suppress sending a response to a signal received by the at least one wireless transceiver. Controller 110 determines how often probe responses are suppressed is based on the current load for the wireless channel associated with the at least one wireless transceiver.

In an example embodiment, the load is based on channel utilization. In another example embodiment, the load is based on interference. In yet another example embodiment, the load is based on a combination of channel utilization and interference. For example, where channel load (or available bandwidth) is a measurement of radio channel utilization. The amount of time the energy level on the channel is over certain amount of threshold such that the channel is considered to be occupied is measured. In an example embodiment, a clear channel assessment (CCA) threshold is used for determining channel load. The lowest load is 0% and the highest is 100%, for example:

Channel load percentage=F(Time, ccaUtil);

Channel load percentage=F(Time, Spectrum Measurement); or

Channel load percentage=F(Time, ccaUtil), Spectrum Measurement).

Controller 110 can be configure to receive the data from individual APs 104, 106, 108 at predetermined time periods such as every 60 to 3600 seconds update channel load statistics. Accordingly, controller 110 can suppress responses (such as probe responses) from APs 104, 106, 108 to wireless devices based on the channel load (available bandwidth). Response signals (such as probe responses) will be suppressed more frequently for APs with higher load (hence with lower available bandwidth) than for APs with a lower load.

In an example embodiment, controller 110 determines which AP (or radio for APs with multiple radios) has the lowest load/most available bandwidth, Controller 110 configures the AP with lowest load to respond to all probe requests. For example if AP1 104 has a load of 10%, AP2 106 has a load of 5% and APn 108 has a load of 40%, controller 110 selects AP2 106 to respond to all probe requests.

In an example embodiment, controller 110 is configured to group wireless transceivers (APs) with neighboring wireless transceivers (APs). In particular embodiments, controller 110 is further configured to sort neighboring wireless transceivers by load. Controller 110 suppresses probe responses for wireless transceivers with less available bandwidth more frequently than for wireless transceivers with greater available bandwidth.

For example, each AP radio can be ranked against its first hop neighbors. The Received Signal Strength Indication (RSSI) of neighbor packets are measured. First hop neighbors are defined to be radios of RSSI stronger or equal to the strongest RSSI neighbor plus −5 dBm. In an example embodiment, this threshold is around −70 dBm. The ranking can be used to derive the probe regulation schedule for the radios within a neighborhood, and can be used for selection of the designated AP radio for a wireless client. The ranking algorithm can be run as often as desired, e.g., every 10 to 60 seconds, with a snapshot of the channel utilization. The ranking can be done by sorting the neighbors into nodes of a heap like sorting tree. The depth level of a radio on the tree is its ranking. Multiple levels can be collapsed later to map to a probe regulation schedule level.

Figure 2:
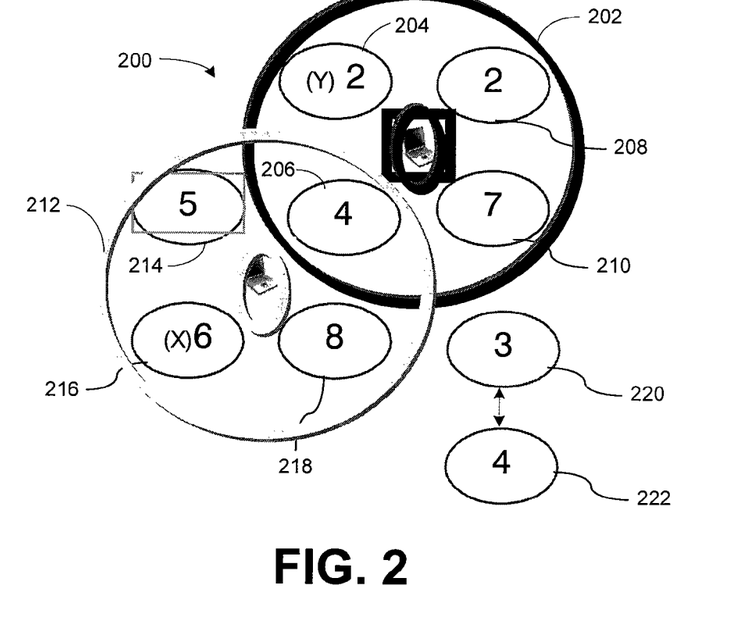
FIG. 2 illustrates an example of a network with neighboring access points with loads rankings for each access point.
Figure 3:
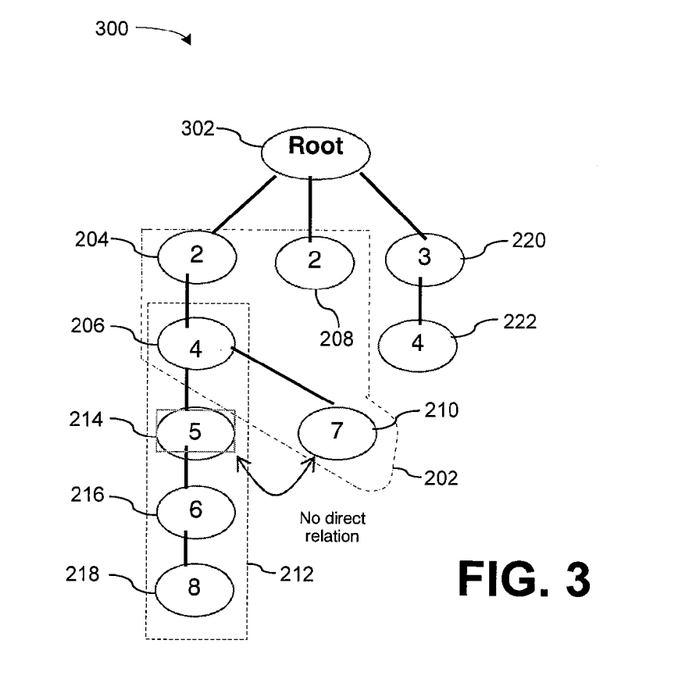
FIG. 3 illustrates an example sort order for the access points illustrated in FIG.

Referring to FIGS. 2 and 3, with continued reference to FIG. 1, there is illustrated an example of a network 200 with neighboring APs and a sorted ranking 300. In the illustrated example, A first neighborhood 202 comprises APs 204, 206, 208, 210. A second neighborhood 212 comprises APs 206, 214, 216, 218. APs 220 and 222 are neighboring to each other but do not belong to either neighborhood 202 or neighborhood 212. The numbers inside the APs represent a load metric for the AP. For example, APs 202, and 204 have highest loads (2), followed by AP 220 (3), APs 206, 222 (4), AP 214 (5), AP 216 (6), AP 210 (7), and lastly AP 218 (8). Note that AP 206 belongs to both first neighborhood 202 and second neighborhood 212. Moreover APs may be grouped by range of loads (e.g. APs with 5-10% load rated at one level and APs at 11-20% rated at another level).

The sorted ranking 300 in FIG. 3 begins at a root level 302. APs 204 and 206 which both belong to first neighborhood 202 are just below root level 302. AP 220 which is not part of neighborhood 202 or neighborhood 212 is also attached to the root level 302 as it is the highest ranked AP in its group. APs 214, 216, and 218 are ranked respectively below AP 204 based on their load and membership in neighborhood 212. APs 206 and 210 are also ranked respectively below AP 204 as part of neighborhood 202. Note that AP 210 is coupled to AP 206 because they belong to neighborhood 202, but AP 210 is not connected to APs 214, 216, 218 because they are not in the same neighborhood. Finally, AP 222 is coupled to AP 220.

Figure 4:
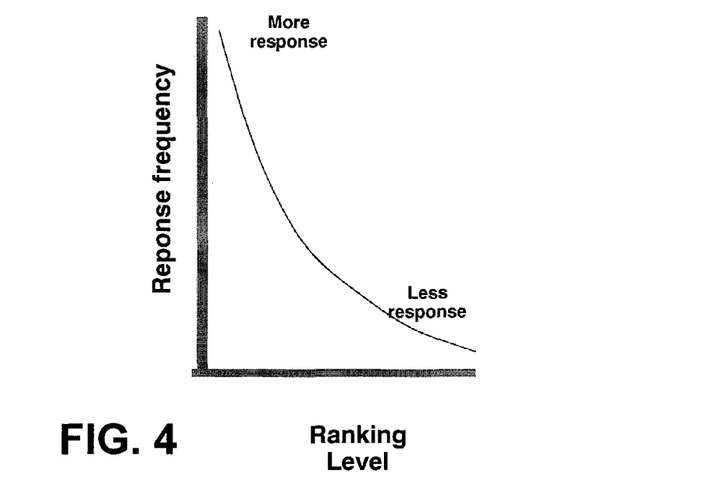
FIG. 4 illustrates an example graph illustrating response frequency as a function of ranking level.

In an example embodiment, controller 110 then maps a frequency for each AP to respond to probe requests based on the rankings generated in FIG. 3. For example, because APs 204, 206, 220 have the lightest loads (the actual ranking is based on the level (depth) in the tree so APs 204, 208 are level 1, APs 206, 210 are level 2, etc.), their probe responses will be suppressed the least. Followed by AP 206, then followed by APs 214, 210, which are then followed by AP 216, 218. For example APs 204, 208, 220 can be configured to respond to 10% of all probe requests, APs 206,222 to 20%, APs 214, 210 to 30%, AP 216 to 40% and AP 218 to 50 to 100%. For example, FIG. 4 illustrates an example showing the inverse relationship between load and response frequency. The higher the ranking (closer to root 302), the less often responses are suppressed, where responses from lower ranked APs (those farthest away from root 302) are suppressed more frequently.

In an example embodiment, the partial order sorted tree logic can be implemented as follows:

1) Create a default node corresponding to root node, all nodes are considered to be direct 1-hop neighbors of the root node; and 2) Pick the node with the lightest load metric and add it as a child to the node with whom it is a direct 1-hop neighbor.
   a. Root node should be considered only as the last resort (where no other 1-hop neighbors are available in the tree currently being built)
   b. Selection ties can be broken arbitrarily or on the basis of consistent criteria such as priority In an example embodiment, controller 110 may determine if a wireless device 112 is communicating with one of APs 104, 106, 108 is capable of communicating on multiple bands (for example a dual band radio). If wireless device 112 is capable of communicating on multiple bands, then controller 110 may suppress responses to the wireless device on a selected channel. For example, if a network supports both 2.4 GHz and 5 GHz channels. Controller 110 may suppress probe responses for a dual band radio on the 2.4 GHz band which should result in the wireless device switching to a 5 GHz channel. Controller 110 would have APs operating on the second channel respond to probe requests from the wireless device. If, however, wireless device 112 does not associate with an AP on a second channel (e.g., a 5 GHz channel) after a predetermined time period, controller 110 may allow wireless device 112 to associate with one of APs 104, 106, 108 on a first channel (e.g. a 2.4 GHz channel).

In an example embodiment, controller 110 may suppress probe responses to determine which wireless transceiver (for example which one of APs 104, 106, 208) is receiving the strongest signal from the wireless transceiver 112 at a highest signal strength. Controller 110 will then stop suppressing probe responses from the AP receiving the strongest signal from wireless device 112. This feature may be useful with neighboring APs that are operating on different channels. For example, wireless device 112 attempting to associate with an AP cycles through its channels and sends a probe request on each channel. By suppressing a response, controller 110 can determine which AP is receiving the strongest signal from wireless device 112 after the device has cycled through the channels and stop suppressing (and/or direct) the AP receiving the strongest signal to send a probe response. In particular embodiments, controller 110 may select an AP for wireless device 112 based on channel load and may also include signal strength. For example, if the load on the AP that has the strongest signal from wireless device 112 is above a predetermined threshold (for example 90%), then controller 110 may select an AP for wireless device 112 with sufficient signal strength (e.g., above a certain threshold such as −10 dBm) with a load below a predefined threshold (e.g. below 50%), or the lowest load if multiple APs meet the criteria.

In an example embodiment, one or more of the aforementioned algorithms are performed periodically. One or more of the aforementioned algorithms may also be performed each time wireless device 112 roams.

Figure 5:
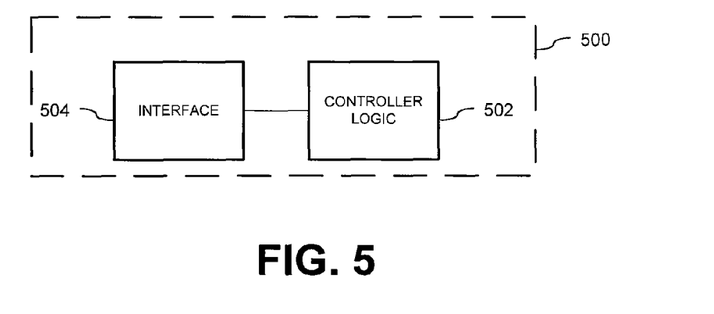
FIG. 5 is a block diagram of an apparatus upon which an example embodiment may be implemented.

FIG. 5 is a block diagram of an apparatus 500 upon which an example embodiment may be implemented. Apparatus 500 comprises an interface 504 configured for communicating with external devices and controller logic 502 that performs the functionality described herein. For example, controller logic 502 can be employed for implementing the functionality of controller 110 in FIG. 1.

Figure 6:
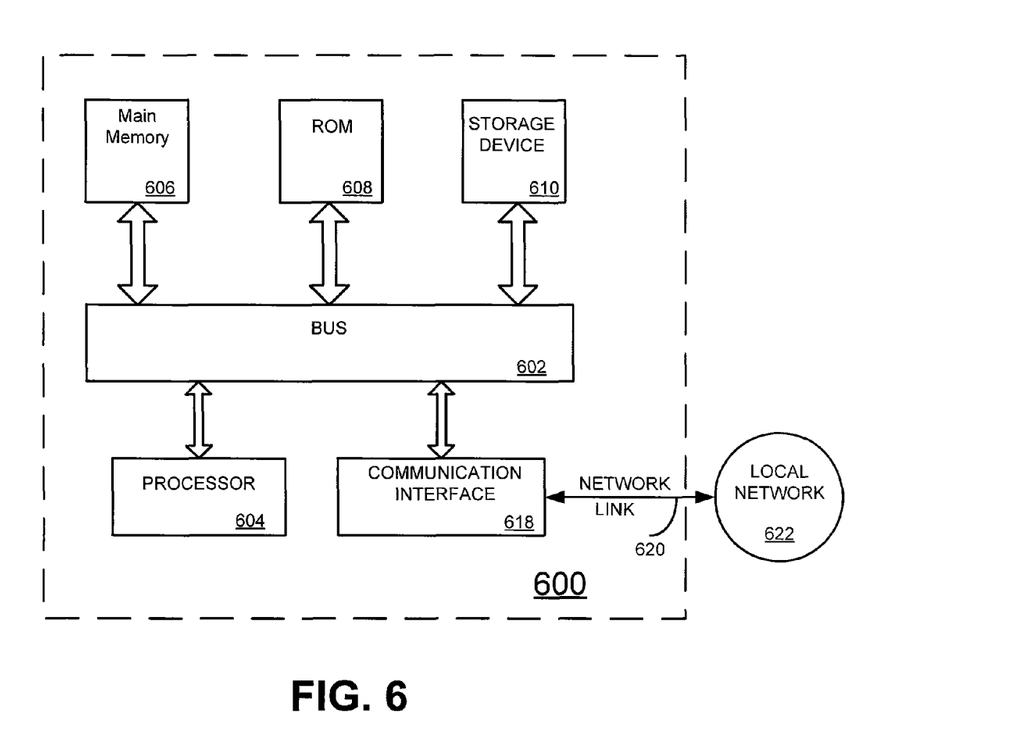
FIG. 6 is a block diagram of a computer system upon which an example embodiment may be implemented.

FIG. 6 is a block diagram of a computer system upon which an example embodiment may be implemented. For example computer system 600 can be employed for implementing the functionality of controller logic 502 (FIG. 5) and/or controller 110 (FIG. 1). Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

An aspect of the example embodiment is related to the use of computer system 600 for load based probe response scheduling. According to an example embodiment, load based probe response scheduling is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

Various forms of computer-readable media may be involved in carrying one or more sequences of one or more instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

Computer system 600 also includes a communication interlace 618 coupled to bus 602. Communication interface 618 provides a two-way data communication coupling computer system 600 to a network link 620 that is connected to a local network 622. This allows data to be acquired from external devices (not shown, see e.g., APs 104, 104, 108 in FIG. 1).

In view of the foregoing structural and functional features described above, methodologies in accordance with example embodiments will be better appreciated with reference to FIGS. 7-10. While, for purposes of simplicity of explanation, the methodologies of FIGS. 7-10 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement a methodology described herein in accordance with an aspect of an example embodiment. The methodologies of FIGS. 7-10 described herein are suitably adapted to be implemented in hardware, software, or a combination thereof. For example, the methodologies of FIGS. 7-10 may be implemented by controller 102 (FIG. 1), controller logic 502 (FIG. 5), and/or processor 604 (FIG. 6).

Figure 7:
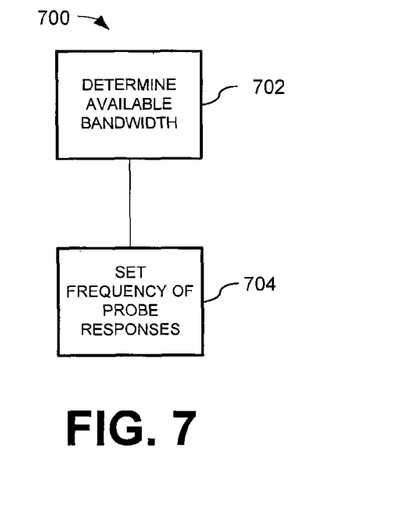
FIG. 7 is a block diagram illustrating an example of a methodology for determining how often a wireless device will respond to probe responses.

FIG. 7 is a block diagram illustrating an example of a methodology 700 for determining how often a wireless device, such as an AP, will respond to probe responses. At 702, the load on a channel is determined. The load may be determined by any suitable means, including but not limited to measuring channel utilization as described herein, measuring interference sources, or a combination of these techniques.

At 704, the frequency of probe responses is set. The frequency may be set in accordance with FIG. 4 where a wireless device on a lightly loaded channel (for example 0-10%) may respond to all probe responses or a majority of responses, e.g., respond to nine out of ten requests. A wireless device on a heavily loaded channel (for example 90-100%) may ignore all probe requests or respond to very few probe request, e.g., one out of ten. Wireless devices operating on moderately loaded channels (such as 40-60%) may respond more frequently than a wireless device on a heavily loaded channel, but less frequently than a wireless device on a lightly loaded channel, e.g., a wireless device on a moderately loaded channel may respond to five out of ten probe requests.

Figure 8:
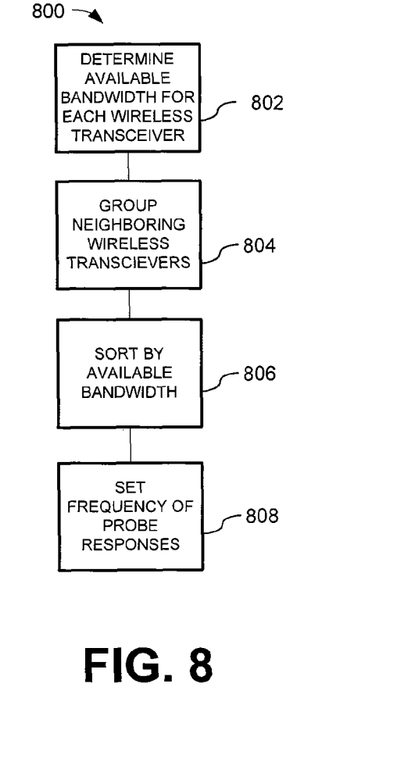
FIG. 8 is a block diagram illustrating an example of a methodology for determining the frequency of probe responses for a plurality of neighboring access points.

FIG. 8 is a block diagram illustrating an example of a methodology 800 for determining the frequency of probe responses for a plurality of neighboring access points (APs). At 802, the channel load for each wireless transceiver is determined. Note that some AP's may have multiple radios. The load may be determined by any suitable means, including but not limited to measuring channel utilization as described herein supra, measuring interference sources, or a combination of these techniques.

At 804, wireless transceivers are grouped with neighboring wireless transceivers. Any criteria may be used for classifying a wireless transceiver as a neighboring wireless transceiver such as for example, received signal strength. The Received Signal Strength Indication (RSSI) of neighbor packets are measured. In an example embedment, first hop neighbors are defined to be radios of RSSI stronger or equal to the strongest RSSI neighbor plus −5 dBm.

At 806, the AP's are sorted and ranked based on load. For example, each AP radio can be ranked against its first hop neighbors. The ranking can be used to derive the probe regulation schedule for the radios within a neighborhood, and can be used for selection of the designated AP radio for a wireless client. The ranking algorithm can be run as often as desired, e.g., every 10 to 60 seconds, with a snapshot of the channel utilization. The ranking can be done by sorting the neighbors into nodes of a heap like sorting tree (see for example FIG. 3). The depth level of a radio on the tree is its ranking. Multiple levels can be collapsed later to map to a probe regulation schedule level.

At 808, the probe regulation schedule, which sets the frequency of probe responses or how often a probe response is sent, is generated. Wireless transceivers with higher loads can have a lower response frequency (e.g. respond to two out of ten probe requests) whereas wireless transceivers with lower loads will have a higher response frequency (e.g., eight out of ten). In an example embodiment, methodology 800 is performed periodically, for example every 60 seconds.

Figure 9:
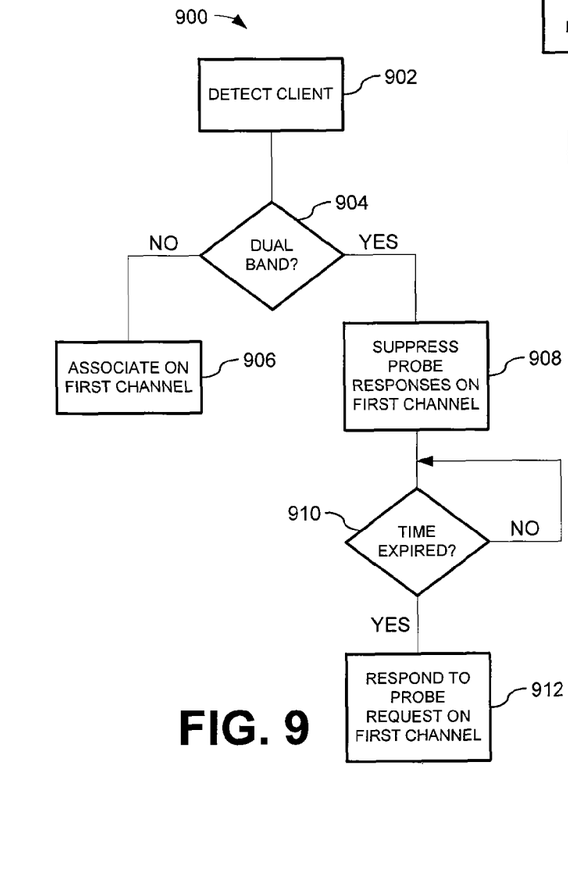
FIG. 9 is a block diagram illustrating an example of a method for implementing band selection.

FIG. 9 is a block diagram illustrating an example of a method 900 for implementing band selection. Methodology 900 may be useful in situations where some radios are single band radios and other radios are multi-band radios. The multi-band radios can be directed to a different channel than the single band radios to reduce congestion on the wireless channels occupied by single band radios.

At 902, a wireless device (client) is detected. For example, a probe request may be received from the wireless client on a first channel belonging to a first band.

At 904, a determination is made whether the wireless device is a dual (or multi, e.g., greater than two) band device. This determination can be made based on data sent by the wireless device (for example data included in a probe request) or may be determined by observing the wireless device over time (for example by determining that the wireless device attempted to connect on another band).

If, at 904, a determination is made that the wireless device is a single band device (NO), at 906 the wireless device is allowed to associate on the first channel. Probe responses may be sent or suppressed on the first channel as described in example embodiments herein supra.

If, at 904, a determination is made that the wireless device is a dual (or multi) band device, at 908 probe responses are suppressed on the first channel. By suppressing probe responses on the first channel, the wireless device should attempt to locate an AP on an alternate channel on an alternate band.

In an example embodiment, as illustrated at 910, a determination is made whether the wireless device associated on an alternate band. For example a timer may be set. If the time period has not expired (NO), waiting for the wireless device to associate on an alternate band continues. If, however, time expires (YES), the wireless device is allowed to associate on the first channel. Thus, at 912, a probe response is sent to the wireless device.

Figure 10:
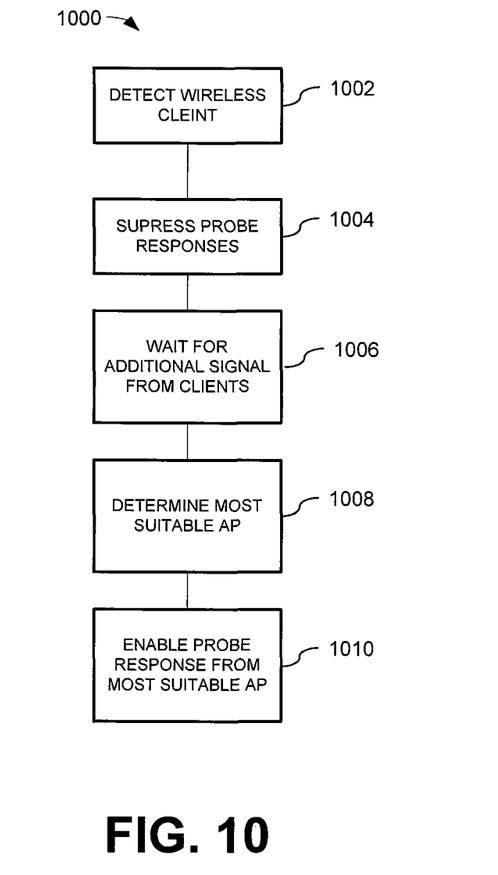
FIG. 10 is a block diagram illustrating an example of a methodology for suppressing signals to a wireless device to determine a suitable access point for responding to the wireless device.

FIG. 10 is a block diagram illustrating an example of a methodology 1000 for suppressing signals to a wireless device to determine a suitable access point for responding to the wireless device. In this example, wireless devices such as APs do not respond to probe requests from a wireless device for a predetermined time period in order to allow the wireless device to send probe requests on multiple channels, which will allow neighboring APs on other channels an opportunity to receive a signal from the wireless device and measure the strength of received signals.

For example, at 1002, a wireless device is detected. For example, the wireless device may send probe requests, which as illustrated at 1004, responses to probe requests sent from the wireless device are suppressed. As illustrated at 1006, methodology 1000 waits for a predetermined time period to allow the wireless device to send signals such as probe requests on additional/alternate channels.

At 1008, the most suitable AP for the wireless device is determined. Determining the most suitable AP may be based on any predetermined criteria, such as received signal strength and/or channel load on a channel.

A 1010, probe responses are enabled for the most suitable AP. This will steer the wireless device to the most suitable AP. Probe responses from neighboring APs remain suppressed. However, in an example embodiment, probe responses from neighboring APs may be enabled if the wireless device does not associate with the most suitable AP within a predetermined time period.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method, comprising:
receiving a wireless signal from a wireless device;
determining whether the wireless device is capable of communicating on multiple channels;
after determining the wireless device is capable of communicating on multiple channels, suppressing a probe response to a probe request received from the wireless device on a first channel; and
waiting for a predetermined amount of time to determine whether the wireless device associates with a second channel; and
sending the probe response to the probe request on the first channel responsive to determining the predetermined amount of time has expired.

2. The method according to claim 1, further comprising sending a probe response to the wireless device responsive to receiving a probe request on the second channel.

3. The method according to claim 1, further comprising:
receiving a wireless signal from a second wireless device;
determining whether the wireless device is capable of communicating on multiple channels; and
sending a probe response for a probe request received from the second wireless device on the first channel responsive to determining the wireless device is incapable of communicating on multiple channels.

4. Logic encoded on at least one non-transitory computer readable medium for execution, and when executed operable to:
receive data representative of a signal strength for a wireless device from a plurality of wireless transceivers;
suppress sending a response to a signal from the wireless device for a predetermined time period during which the wireless device transmits probe requests on multiple channels; and
select a selected one of the plurality of wireless transceivers that received the signal from the wireless device to respond to the signal from the wireless device based on received signal strength.

5. The logic of claim 4, wherein the logic is further operable to select the selected one of the plurality of wireless transceivers based on current load and received signal strength.

\* \* \* \* \*

UNITED STATES PATENT AND TRADEMARK OFFICE
CERTIFICATE OF CORRECTION

PATENT NO. : 10,034,300 B2
APPLICATION NO. : 12/797913
DATED : July 24, 2018
INVENTOR(S) : Hari Rangarajan et al.

It is certified that error appears in the above-identified patent and that said Letters Patent is hereby corrected as shown below:

On the Title Page

In item (73), in Column 1, in "Assignee", Line 1, delete "Inc," and insert -- Inc., --, therefor.

In the Drawings

On Sheet 3 of 5, in figure 4, (y-axis), Line 1, delete "Reponse" and insert -- Response --, therefor.

On Sheet 4 of 5, in figure 8, reference numeral 804, Line 4, delete "TRANSCIEVERS" and insert -- TRANSCEIVERS --, therefor.

On Sheet 5 of 5, in figure 10, reference numeral 1002, Line 2, delete "CLEINT" and insert -- CLIENT --, therefor.

On Sheet 5 of 5, in figure 10, reference numeral 1004, Line 2, delete "SUPRESS" and insert -- SUPPRESS --, therefor.

In the Specification

In Column 4, Line 31, delete "A" and insert -- a --, therefor.

In Column 5, Line 16, after "built)" insert -- . --.

In Column 5, Line 18, after "priority" insert -- . --.

Signed and Sealed this
Second Day of October, 2018

Andrei Iancu
*Director of the United States Patent and Trademark Office*